US007979603B2

(12) United States Patent
Yamaguchi et al.

(10) Patent No.: US 7,979,603 B2
(45) Date of Patent: Jul. 12, 2011

(54) STORAGE SYSTEM AND METHOD FOR CONTROLLING ACTIVATION OF COMMAND

(75) Inventors: Yasuhiko Yamaguchi, Hiratsuka (JP); Ken Tokoro, Odawara (JP); Youichi Gotoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 12/333,653

(22) Filed: Dec. 12, 2008

(65) Prior Publication Data

US 2010/0100645 A1 Apr. 22, 2010

(30) Foreign Application Priority Data

Oct. 22, 2008 (JP) ................................ 2008-272551

(51) Int. Cl.
*G06F 3/00* (2006.01)
(52) U.S. Cl. .................. 710/40; 710/5; 710/33; 710/36; 710/52; 710/264
(58) Field of Classification Search ................ 710/5, 33, 710/36, 40, 52, 264
See application file for complete search history.

(56) References Cited

U.S. PATENT DOCUMENTS

| 6,667,926 B1* | 12/2003 | Chen et al. ................. 365/221 |
| 2002/0026543 A1* | 2/2002 | Tojima et al. .................. 710/22 |
| 2005/0066125 A1* | 3/2005 | Tanaka et al. ................. 711/114 |
| 2005/0071577 A1* | 3/2005 | Dias et al. ...................... 711/151 |
| 2005/0154830 A1 | 7/2005 | Mizuno et al. |
| 2008/0104283 A1* | 5/2008 | Shin et al. ......................... 710/6 |
| 2008/0222640 A1* | 9/2008 | Daly et al. ..................... 718/103 |
| 2009/0165009 A1* | 6/2009 | Heffernan et al. ............ 718/103 |
| 2010/0082856 A1* | 4/2010 | Kimoto et al. ................. 710/45 |

FOREIGN PATENT DOCUMENTS

JP 2002-236560 8/2002

* cited by examiner

*Primary Examiner* — Tariq Hafiz
*Assistant Examiner* — Jasjit S Vidwan
(74) *Attorney, Agent, or Firm* — Antonelli, Terry, Stout & Kraus, LLP.

(57) ABSTRACT

A storage system including a queue corresponding to each priority level of command and an activation order control part. A command received from a host is accumulated in the queue corresponding to the specified priority. The activation order control part decides the number of activation object commands to be activated among accumulated commands, based on the priority corresponding to the queue. The activation order control part decides the activation order of the activation object commands, based on a activation object command number decided for each queue, so that the average value of logical response time of the activation object command may be shorter at the higher priority. The activation object command is activated in accordance with the decided activation order.

18 Claims, 10 Drawing Sheets

US 7,979,603 B2

STORAGE SYSTEM AND METHOD FOR CONTROLLING ACTIVATION OF COMMAND

CROSS REFERENCES TO RELATED APPLICATIONS

This application relates to and claims priority from Japanese Patent Application No. 2008-272551, filed on Oct. 22, 2008, the entire disclosure of which is incorporated herein by reference.

BACKGROUND OF THE INVENTION

1. Field of the Invention

The present invention relates to control of the activation of command in a storage system.

2. Description of the Related Art

The storage system for controlling the activation of command is well known as disclosed in patent document 1 described below, for example.

Patent document 1: JP-A-2002-236560

SUMMARY OF THE INVENTION

A command received by the storage system is once accumulated in a storage resource (e.g., queue). To control the activation of the command, a method for deciding the number of commands activated per unit time (hereinafter the activation object command number) in accordance with the priority level of command is conceived. With this method, for example, the activation object command number is larger for the command with higher priority.

However, with this method, the response time for the command (time length from issuing the command to returning the response) may not accord with the priority. More specifically, for example, when a number of commands with higher priority are received, it may occur that the formerly received command is activated earlier and the response is returned (i.e., the response time is shorter), but the subsequently received command with higher priority is activated with delay and the response is returned with delay (i.e., the response time is longer). If the response time is long, the command issuing source (e.g., host computer) controls the command issuing frequency, whereby it is expected that the response time is shortened. However, the command issuing source may not always have a function of controlling the command issuing frequency.

Thus, it is an object of the invention to provide a storage system that can control both the number of commands activated per unit time and the response time length of each command activated in accordance with the priority level of command.

A storage system comprises a queue corresponding to each priority of command and an activation order control part. A command that the storage system receives from a host computer is accumulated in the queue corresponding to the priority specified from the command. The activation order control part decides, for each queue, the number of activation object commands that are the commands to be activated among a plurality of commands accumulated in the queue, based on the priority corresponding to the queue. And the activation order control part decides the activation order of the activation object commands, based on the activation object command number decided for each queue, so that the average value of logical response time of the activation object command may be shorter at the higher priority. The activation object command is activated in accordance with the decided activation order.

DESCRIPTION OF THE PREFERRED EMBODIMENTS

One embodiment of the present invention will be described below with reference to the drawings. In the following explanation, a computer program is appropriately made the subject in the description of a process to avoid the redundancy, though the process is actually performed by a processor for executing the computer program.

Figure 1:
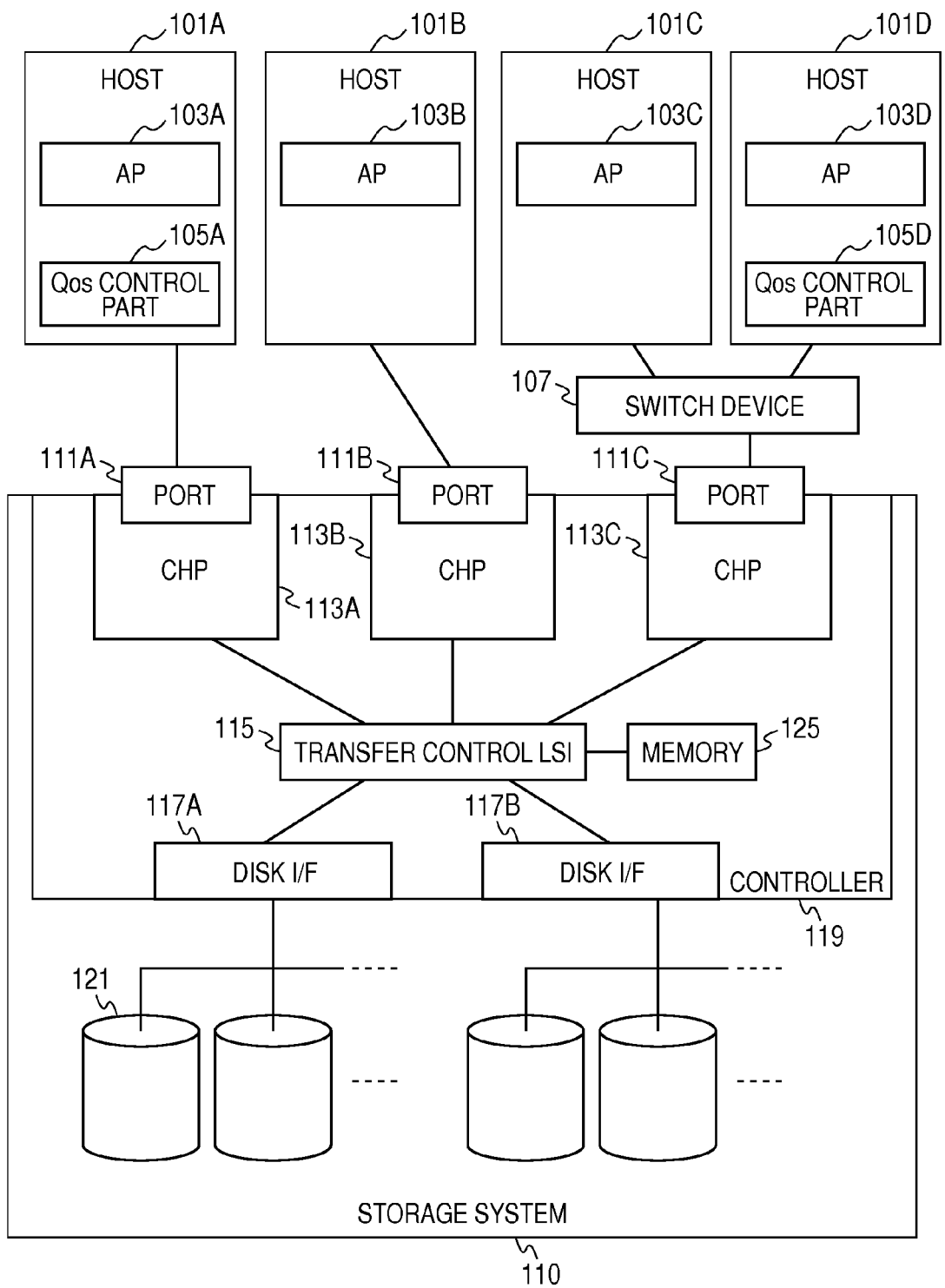
FIG. 1 shows a configuration example of a computer system according to one embodiment of the present invention.

FIG. 1 shows a configuration example of a computer system according to one embodiment of the invention.

A storage system 110 is connected to one host computer (hereinafter a host) or more, for example, four hosts 101A to 101D. Each of the hosts 101A to 101D has the information processing resources such as a CPU and a memory. The application programs (AP) 103A to 103D are run on the hosts 101A to 101D. Of the hosts 101A to 101D, the host 101A (101D) is provided with a Qos (Quality of Service) control part 105A (105D). The Qos control part 105A (105D) has a function of controlling the command issuing frequency. The Qos control part may be provided in an external apparatus of the storage system 110 other than the host, for example, a management computer for the storage system. The details of the Qos control part will be described later.

The storage system 110 has a plurality of ports, for example, three ports 111A to 111C. Each port accepts a command such as an I/O (Input/Output) command from the host. In an example of FIG. 1, the port 111A is connected to the host 101A, the port 111B is connected to the host 101B, and the port 111C is connected via a switch device 107 to the hosts 101C and 101D. The switch device 107 is the device (e.g., a fiber channel switch) provided in a communication network such as a SAN (Storage Area Network).

The storage system 110 comprises a controller 119 and an HDD (Hard Disk Drive) group 120.

The HDD group 120 has a plurality of RAID (Redundant Array of Independent (or Inexpensive) Disks) groups. A RAID group 151, which is composed of a plurality of HDDs 121, stores the data according to a predetermined RAID level. An LU (Logical Unit) as a logical storage device is formed based on a storage space of the RAID group 151. Instead of the HDD 121, other kinds of physical storage device such as a flash memory may be employed.

The controller 119 has one or more (e.g., three) CHP (Channel Processor) 113A to 113C, a memory 125, a transfer LSI (Large Scale Integration) 122, and one or more (e.g., two) disk I/F 117A and 117B.

A CHP (e.g., 113A) is a communication interface unit with the host (e.g., 101A), and has one or more ports (e.g., one port 111A). An I/O command from the host is accepted through the port provided for the CHP. In the case where the I/O command is a write command, the data of write object is stored through the CHP 5 in a cache area of the memory 125. On the other hand, in the case where the I/O command is a read command, the data of read object is read from the cache area and sent through the CHP to the host.

The transfer LSI 115 controls the exchange between the components within the controller 119.

The disk I/F (e.g., 117A) is a communication interface unit with the HDD 121. In the case where the I/O command received by the CHP is a write command, the data of write object is read from the cache area, and written through the disk I/F into the LU (HDD 121 based on the LU) designated by the command. On the other hand, in the case where the I/O command received by the CHP is a read command, the data of read object is read from the LU (HDD 121 based on the LU) designated by the command, and the read data is written into the cache area.

The above is the outline of the computer system according to this embodiment.

Figure 2:
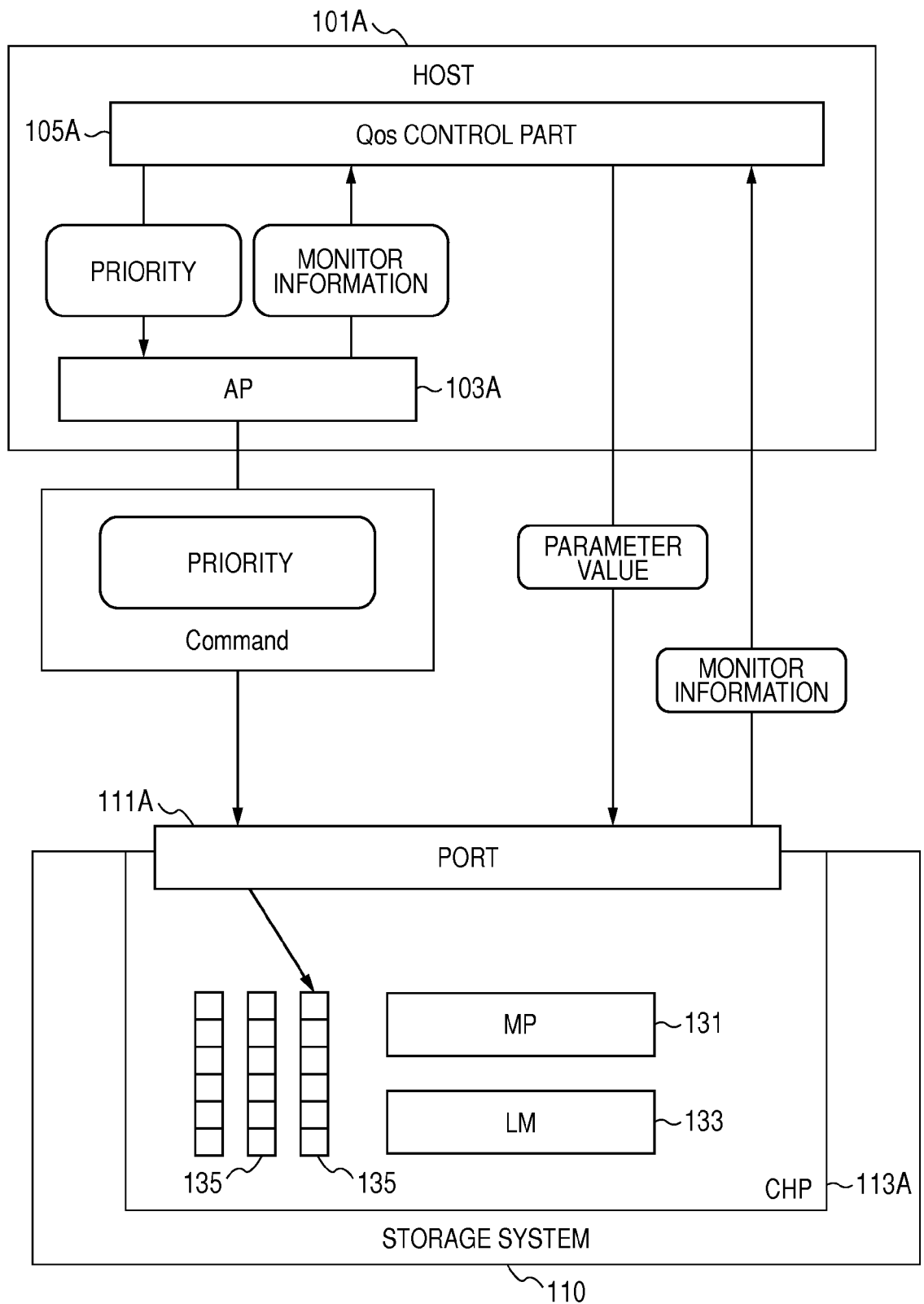
FIG. 2 is an explanatory view for exchange between a host 101A and a CHP 113A.

Referring to FIG. 2, the communication between the host 101A and the storage system 110 will be described below, taking the host 101A and the CHP 113A as an example.

The CHP 113A has the queues 135, 135, ... corresponding to every priority of command, a microprocessor (MP) 131, and a memory (hereinafter LM (Local Memory)) 133, in addition to the port 111A. Each queue 135 is based on the LM 133 and/or another storage resource.

The Qos control part 105A has a general function of making the Qos control. For example, the Qos control part 105A sets various parameter values as will be described later to the CHP 113A, picks up monitor information from the CHP 113A and the AP 103A, and adjusts the command issuing frequency from the AP 103A. The parameter values are set in the LM 133. The monitor information from the CHP 113A includes information on how many commands are accumulated in which queue (priority), for example. The monitor information from the AP 103A includes information representing the command issuing frequency and attribute information of command issued from the AP 103A, for example. The Qos control part 105A designates the priority to be set to the command issued from the AP 103A, based on the monitor information from the AP 103A. The priority designated from the Qos control part 105A is set to the command issued from the AP 103A by the AP 103A. In this embodiment, the "priority" means a label set for each command (e.g., I/O command). In this embodiment, the activation of command is controlled so that a greater number of commands maybe activated in the activation order PG as will be described later and the response time of each command may be shorter at the higher priority.

If the CHP 113A receives a command, the MP 131 specifies the priority included in the command, and accumulates the command in the queue 135 corresponding to the priority specified. The MP 131 performs an activation order decision process. In the activation order decision process, the activation order of commands of activation object among the commands accumulated in the plurality of queues 135 is decided so that the ratio of response time may be inverse ratio of the priority, whereby the activation object commands are activated in accordance with the decided activation order. The activation order decision process is performed for each port 111A. That is, though one port 111A is provided for the CHP 113A in this embodiment, if a plurality of ports 111A are provided for the CHP 113A, the activation order decision process independent for each port 111A is performed. If the plurality of ports 111A are provided for the CHP 113A, a set of the queues 135, 135, ... corresponding to every priority of command may be provided for each port 111A.

Figure 3:
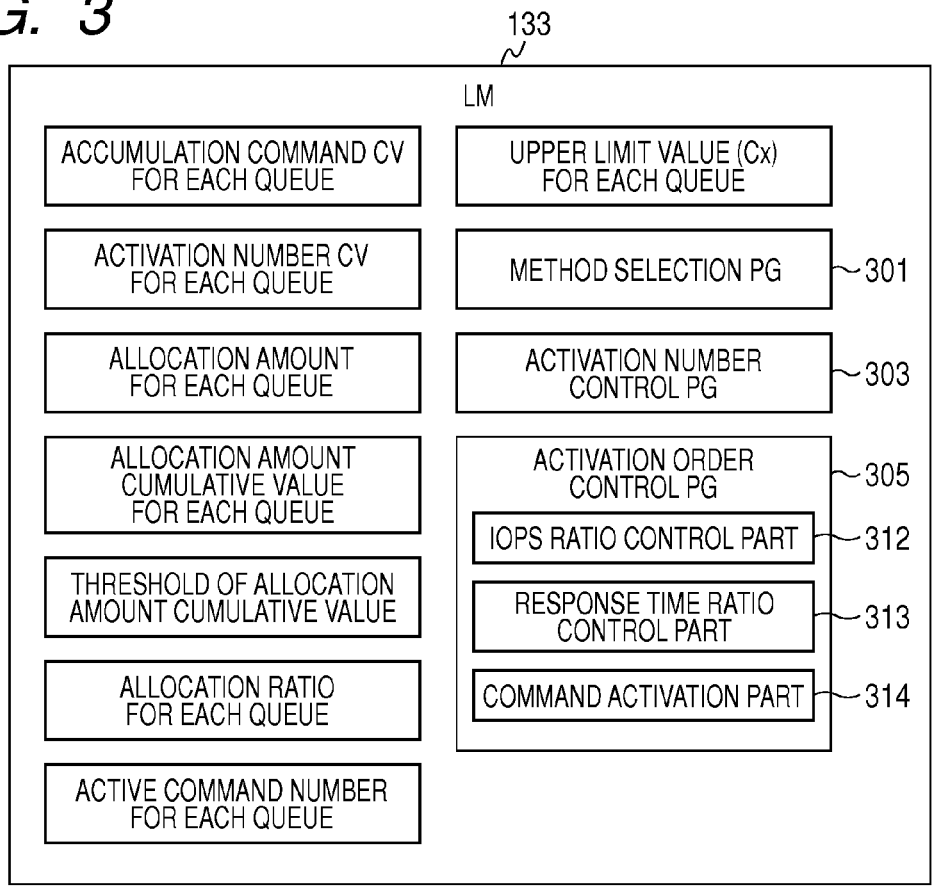
FIG. 3 shows information and a computer program stored in an LM 133.

FIG. 3 shows information and a computer program stored in the LM 133.

The information stored in the LM 133 includes the accumulation command CV for each queue, the activation number CV for each queue, the allocation amount for each queue, the allocation amount cumulative value for each queue, a threshold of the allocation amount cumulative value, the allocation ratio for each queue, the active command number for each queue, and the upper limit value for each queue, for example. The examples of computer program include a method selection PG 301, an activation number control PG 303, an activation order control PG 305, and a command accumulation PG 306, for example. These PGs are executed on the MP 131. In the description and the drawings of this embodiment, CV is the abbreviation for count value, and PG is the abbreviation for program.

The accumulation command CV is the value representing the number of commands accumulated in the queue corresponding to the CV. Every time the command is accumulated in the queue, the accumulation command CV corresponding to the queue is incremented by one by the command accumulation PG 306. Also, the accumulation command CV is decremented by one by the activation number control PG 303 or the activation order control PG 305 every time the command is activated from the queue corresponding to the CV.

The activation number CV is the value representing the number of commands that can be activated from the queue corresponding to the CV. Every time the command is activated from the queue, the activation number CV corresponding to the queue is decremented by one by the activation number control PG 303. The initial value of the activation number CV is the value based on the priority for the queue corresponding to the CV, for example, the same value as the allocation amount or allocation ratio for the queue corresponding to the CV.

The allocation amount is the amount representing the ratio of the process for the queue. The allocation amount is one of the preset parameters from the Qos control part 105A. The allocation amount is the value based on the priority corresponding to the queue.

The allocation amount cumulative value is the value representing the accumulating total of allocation amount.

The threshold of the allocation amount cumulative value is the value compared with the allocation amount cumulative value. One threshold is common to all the queues.

The allocation ratio is the ratio of allocation amount.

The active command number is the number of commands that are activated and being executed.

The upper limit value is the value representing the upper limit of the total number of the active command number and the activation object command number.

For the scheduling of activating the command, two kinds of methods are prepared, including an activation number control method and an activation order control method, in this embodiment. The activation number control method involves controlling the activation object command number per unit time for each queue. The activation order control method involves controlling the activation order of activation object commands, in addition to the activation object command number per unit time, for each queue (in which the activation order decision process as previously described is performed). The scheduling according to the activation number control method is performed by the activation number control PG 303, and the scheduling according to the activation order control method is performed by the activation order control PG 305. The activation order control PG 305 has an IOPS control part 312 for making the IOPS ratio control (hereinafter described), a response time ratio control part 313 for making the response time ratio control (hereinafter described), and a command activation part 314 for actually activating the activation object command, for example.

The method selection PG 301 selects the activation number control method or the activation order control method as the scheduling method for activating the command. More specifically, the method selection PG 301 selects which of the activation number control PG 303 and the activation order control PG 305 is performed. This selection is made for each port. Accordingly, a plurality of commands accepted at a certain port are scheduled to activate the commands by the activation number control method, and a plurality of commands accepted at another port are scheduled to activate the commands by the activation order control method.

If the CHP 113A receives a command, the command accumulation PG 306 specifies the priority included in the command, and accumulates the command in the queue corresponding to the specified priority. At this time, the command accumulation PG 306 increments the accumulation command CV corresponding to the queue by one.

The activation number control method, the activation order control method and the method selection will be described below. In the following explanation, the command means the I/O command.

<Activation Number Control Method>

Figure 4:
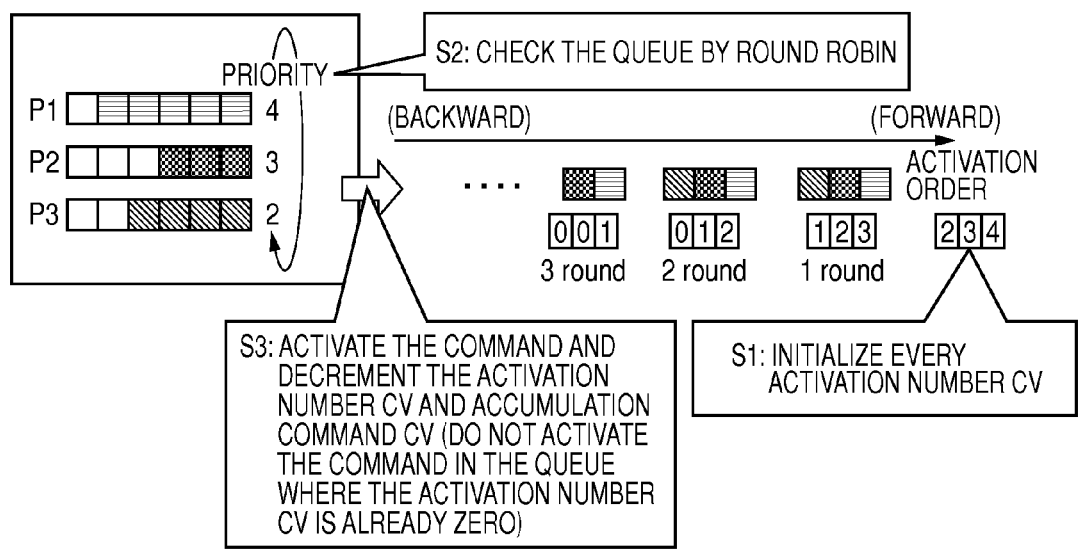
FIG. 4 shows the outline of an activation number control method.

FIG. 4 shows the outline of the activation number control method.

The activation number control method involves controlling the number of commands activated from each queue, so that the ratio of the number of commands activated from each queue may be equal to the allocation ratio. The activation number CV is provided for each queue, as previously described, in which the activation number control PG 303 functions as a counter for updating the activation number CV. The activation number control PG 303 operates in the following way.

For example, it is supposed that there are the queues P1 to P3 corresponding to the priorities 4, 3 and 2 (the priority 1 is the highest here). Also, it is supposed that the three allocation ratios corresponding to the queues P1 to P3 are set to the same values as the priorities 4, 3 and 2, and therefore the initial values of the activation number CV corresponding to the queues P1 to P3 are 4, 3 and 2. Further, it is supposed that five commands are accumulated in the queue P1, three commands are accumulated in the queue P2, and four commands are accumulated in the queue P3.

Herein, if the activation number control PG 303 initializes the activation number CV for each queue (S1), the activation number CV corresponding to the queue P1 to P3 is 4, 3 and 2 (queue [P1, P2, P3]=activation number CV [4, 3, 2]).

Next, the activation number control PG 303 checks the queues by round robin from the queue corresponding to the higher priority (S2). At this time, the activation number control PG 303 activates the first command in the queue and decrements the accumulation command CV and the activation number CV corresponding to the queue by one, if the accumulation command CV and the activation number CV corresponding to the checked queue are greater than zero (S3).

As a result, in the first round check for the queues P1 to P3, one command at the top is activated from each of the queues P1 to P3, and the activation number CV corresponding to each of the queues P1 to P3 is decremented by one, whereby the activation number CV becomes 3, 2 and 1. Similarly, in the second round check for the queues P1 to P3, one command at the top is activated from each of the queues P1 to P3, and the activation number CV corresponding to each of the queues P1 to P3 is decremented by one. Thereby, the activation number CV becomes 2, 1 and 0. That is, the activation number CV corresponding to the queue P3 becomes zero. Therefore, in the third round check for the queues P1 to P3, one command at the top is activated from each of the queues P1 and P2, but no command is activated from the queue P3.

If every activation number CV becomes zero by repeating S2 and S3, the activation number control PG 303 performs step S1 again.

In the above way, the activation number control method involves controlling the number of commands activated from each queue, using the activation number CV. With this method, if the load of each queue (the number of commands accumulated for a fixed time) is almost equal, the ratio of response time for each queue is controlled to be inverse ratio of the priority (inverse ratio of the allocation ratio). Also, since this method has a simpler process than the activation order control method as will be described later, the operation inside the CHP is easy to grasp from the outside (e.g., the Qos control part performed outside in the host or management computer).

Figure 5:
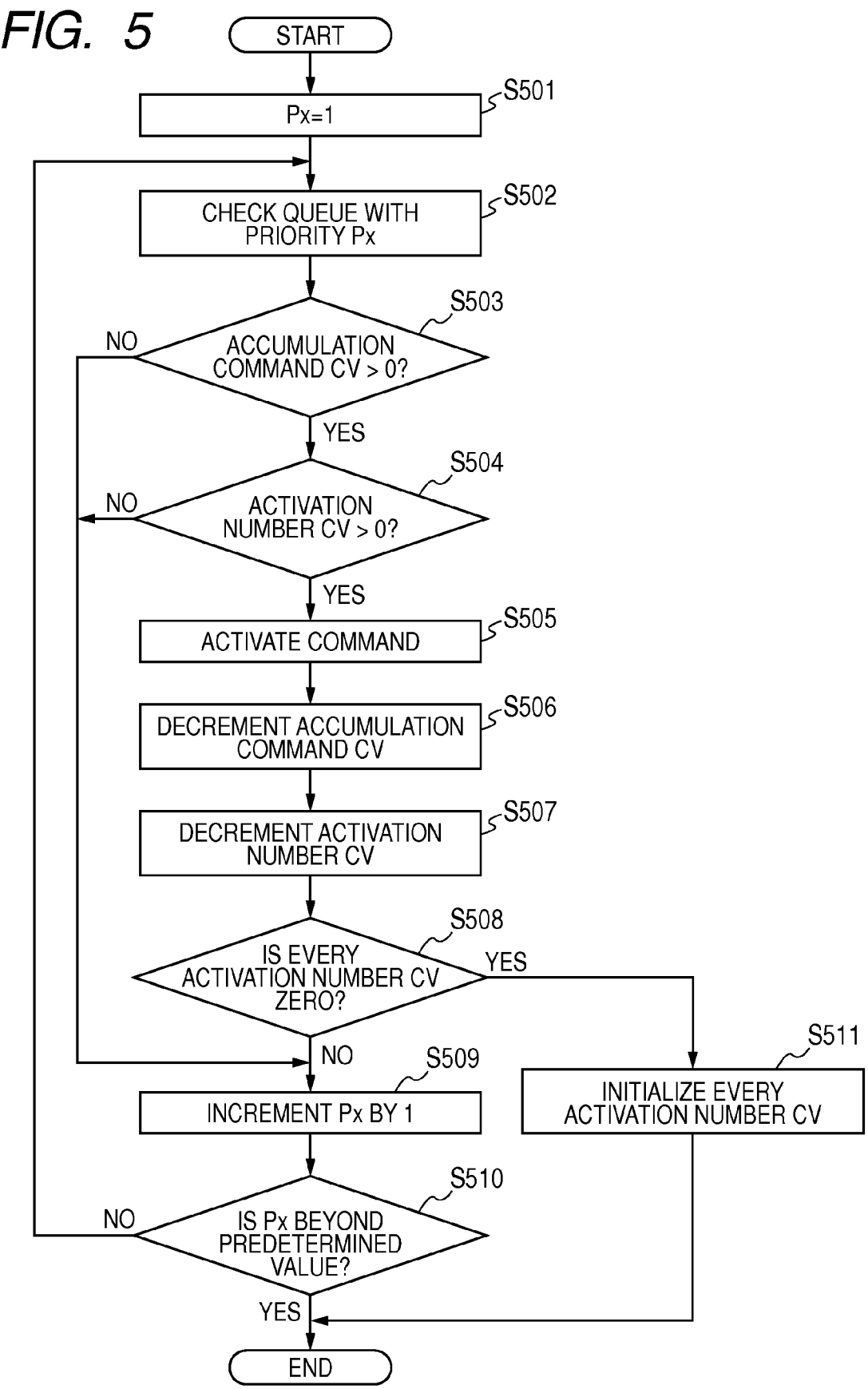
FIG. 5 shows the flow of scheduling in accordance with the activation number control method.

FIG. 5 shows the flow of scheduling in accordance with the activation number control method.

The activation number control PG 303 starts this flow periodically.

First of all, the activation number control PG 303 sets 1 to the value of a parameter Px representing the priority corresponding to the queue of check object (S501). That is, the queues are checked from the queue with the higher priority.

Next, the activation number control PG 303 checks the queue (queue Px) corresponding to the priority Px (S502).

If one of the accumulation command CV and the activation number CV corresponding to the queue Px is zero, the activation number control PG 303 skips S504 to S508 and performs S509 as will be described later.

If both of the accumulation command CV and the activation number CV corresponding to the queue Px are greater than zero (S503: YES and S504: YES), the activation number control PG 303 activates the first command within the queue Px (S505). And the activation number control PG 303 decrements the accumulation command CV and the activation number CV corresponding to the queue Px by one (S506, S507).

After step 507, the activation number control PG 303 judges whether or not every activation number CV is zero (S508).

If the result of judgment at S508 is affirmative (S508: YES), every activation number CV is initialized (S511), and this flow is ended.

On the other hand, if the result of judgment at S508 is negative (S508: NO), Px is incremented by one (S509). After S509, if Px exceeds a predetermined value (S510: YES), this flow is ended because all the queues are checked. On the other hand, if Px does not exceed the predetermined value (S510: NO), the process following S502 is performed for the queue corresponding to Px after increment.

<Activation Order Control Method>

Figure 6:
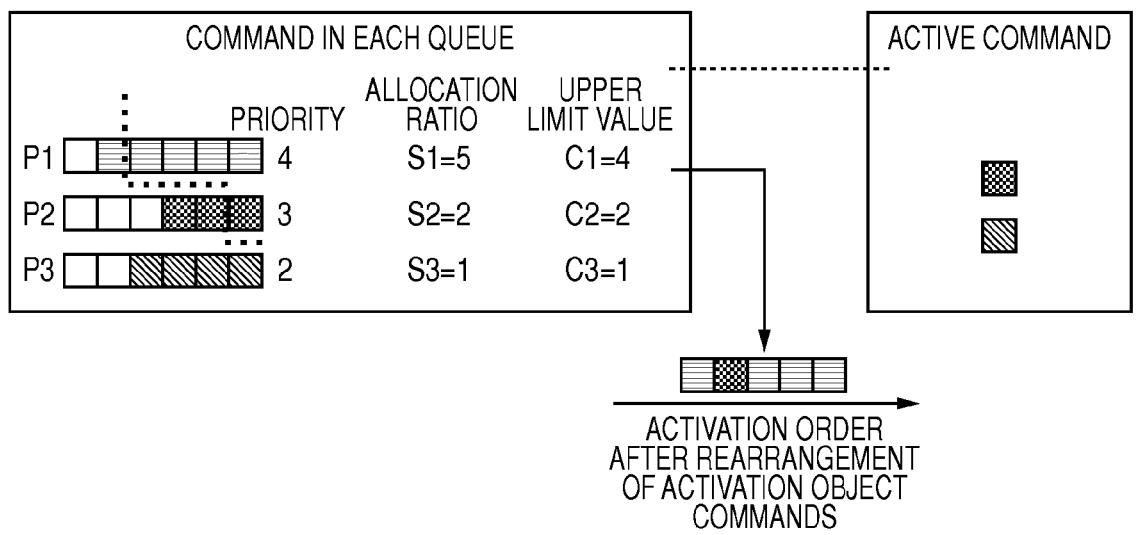
FIG. 6 shows the outline of an activation order control method.

FIG. 6 shows the outline of the activation order control method.

The activation order control method involves controlling not only the number of commands activated but also the order of activating the commands, so that the ratio of response time may be inverse ratio of the allocation ratio. The scheduling in accordance with this method is composed of an activation object command number calculation process (IOPS ratio control) and an activation order decision process (response time ratio control). The IOPS is the abbreviation for IO Per Second as the number of I/O per second.

In the activation object command calculation process, the activation object command number is calculated for each queue, based on the allocation amount and the upper limit value for each queue. Herein, the activation object command number is controlled to be equal to the allocation ratio in the range not exceeding the upper limit value for each queue. Thereby, the activation object command number becomes equal to the allocation ratio, whereby the IOPS ratio control is enabled.

More specifically, it is supposed that the number of commands accumulated in the queue P1 to P3 is 5, 3, and 4, and one command activated from the queue P2 and one command activated from the queue P3 are being executed, for example, as shown in FIG. 6. And it is supposed that the allocation ratio corresponding to the queue P1 to P3 is 5, 2 and 1, and the upper limit value is 4, 2 and 1. In this case, the activation object command only exists on the right of the boundary as indicated by the dotted line on the queue P1 to P3.

That is, since the five commands are accumulated in the queue P1, with the allocation ratio being 5, all the five commands are the activation object command if the upper limit value does not exist. However, the upper limit value is set to 4. Therefore, of the five commands, the first four commands are the activation object command.

Since the three commands are accumulated in the queue P2, with the allocation ratio being 2, two of the three commands are the activation object command if the upper limit value does not exist. However, the upper limit value is set to 2 and one command activated from the queue P2 is active. Therefore, of the three commands, the first command only is the activation object command. That is, the total number of the activation object command number and the active command number is less than or equal to the upper limit value.

Since the four commands are accumulated in the queue P3, with the allocation ratio being 1, and the upper limit value being 1, one of the four commands is the activation object command if there is no active command in the queue P3. However, since one command activated from the queue P3 is active, any of the four commands is not the activation object command. If any one command is made the activation object command, the total number of the activation object command number and the active command number exceeds the upper limit value.

In the above way, the activation object command number is calculated for each queue in the activation object command calculation process.

In the activation order decision process, the activation sequence number is decided for the activation object commands by the number of commands calculated in the activation object command calculation process. That is, the activation order of the activation object commands is decided. The decided activation order is the order in which the ratio of the response time is the inverse ratio of the allocation ratio. Therefore, the decided activation order is the order in which most of the activation object commands in the queue with larger allocation ratio (queue with higher priority) are activated earlier than in the queue with lower allocation ratio (queue with lower priority), as shown in FIG. 6.

Figure 7:
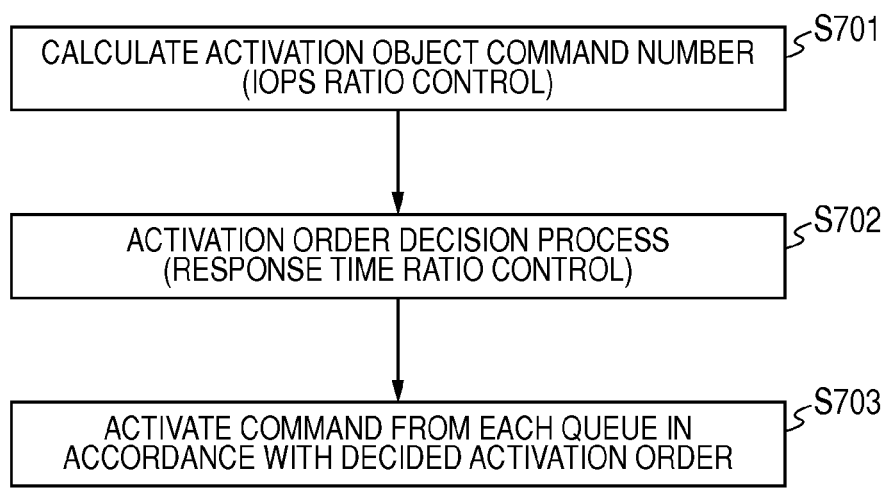
FIG. 7 shows an overall flow of scheduling in accordance with the activation order control method.

FIG. 7 shows the overall flow of scheduling in accordance with the activation order control method. This flow is started periodically.

The IOPS ratio control part 312 within the activation order control PG 305 performs the activation object command number calculation process (S701). That is, the IOPS ratio control part 312 checks the queues by round robin, and calculates the number of commands made the activation object command among the accumulated commands in the checked queue.

The response time ratio control part 313 within the activation order control PG 305 performs the activation order decision process (S702). That is, the response time ratio control part 313 controls the ratio of response time to be inverse ratio of the allocation ratio by deciding the activation order of activation object commands.

Thereafter, the command activation part 314 within the activation order control PG 305 activates the activation object command from each queue in accordance with the decided activation order (S703). At this time, the active command number for the queue corresponding to the activation object command that is activated is incremented by one. Also, if the activation object command is activated, the response to the command is returned to the host of issuing source of the command by the MP 131. If the execution of command is ended, the active command number is decremented by one.

Figure 8:
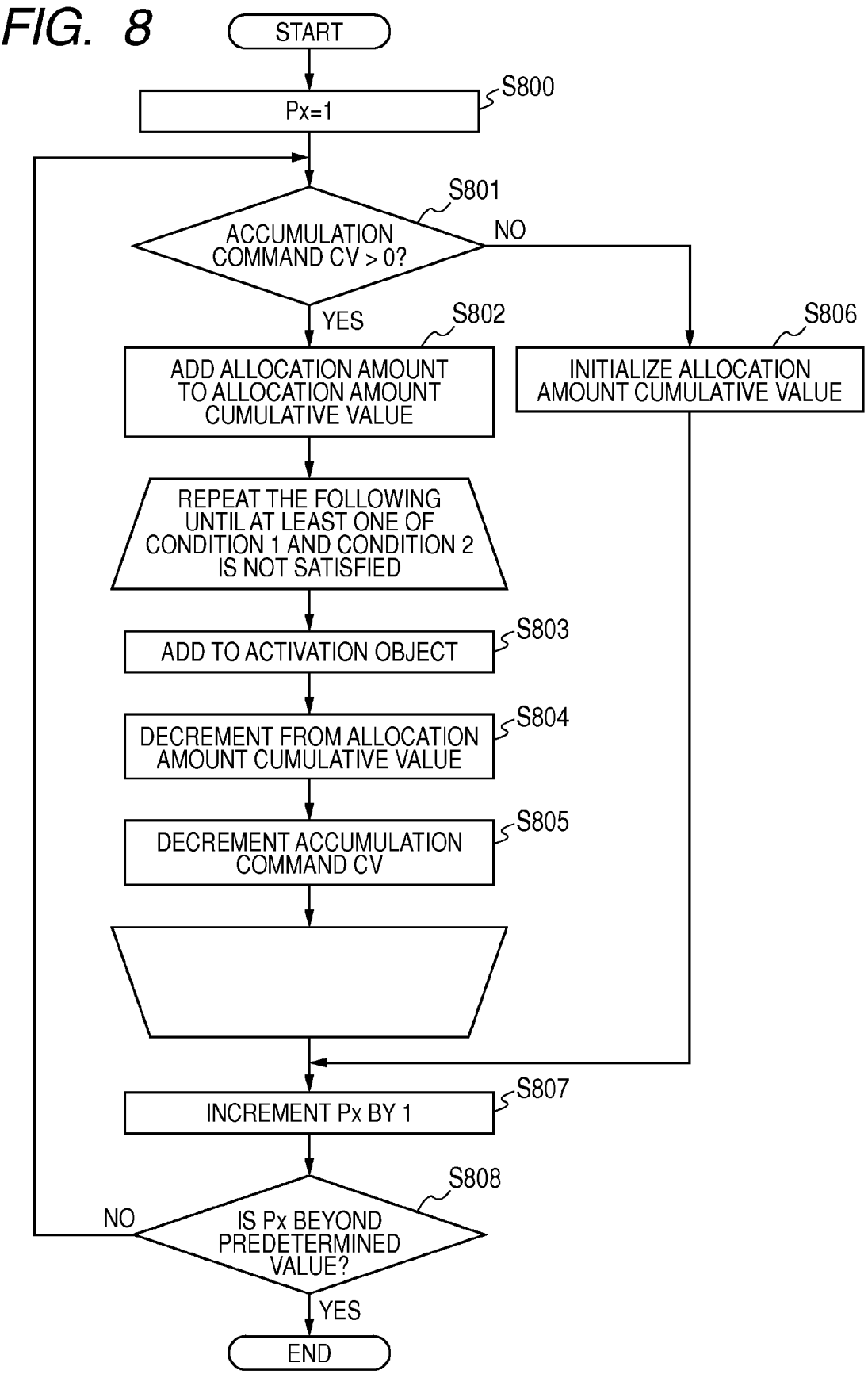
FIG. 8 shows the flow of an activation object command number calculation process.

FIG. 8 shows the flow of the activation object command number calculation process.

The IOPS ratio control part 312 starts this flow periodically.

First of all, the IOPS ratio control part 312 sets 1 to the value of a parameter Px representing the priority corresponding to the queue of check object (S800). That is, the queues are checked from the queue with the higher priority.

Next, the IOPS ratio control part 312 checks whether or not the accumulation command corresponding to the queue (queue Px) corresponding to the priority Px is greater than 0 (i.e., whether or not the command is accumulated in the queue Px) (S801).

If the result of judgment at S801 is negative (S801: NO), the IOPS ratio control part 312 initializes the allocation amount cumulative value corresponding to the queue Px (S806) Thereafter, step S807 is performed.

If the result of judgment at S801 is affirmative (S801: YES), the IOPS ratio control part 312 adds the allocation amount corresponding to the queue Px to the allocation amount cumulative value corresponding to the queue Px (S802).

And the IOPS ratio control part 312 repeats the steps from S803 to S805 until at least one of the following conditions 1 and 2 is not satisfied.

(Condition 1) The sum of the active command number corresponding to the queue Px and the activation object command number corresponding to the queue Px is less than the upper limit value corresponding to the queue Px.

(Condition 2) The allocation amount cumulative value corresponding to the queue Px exceeds the threshold.

At S803, the IOPS ratio control part 312 selects, as the activation object command, the command that is closest to the top and not yet the activation object command among the commands accumulated in the queue Px (e.g., the attribute (i.e., ID) of the command is added to an activation object list (not shown) corresponding to the queue Px). At S804, the IOPS ratio control part 312 decrements the allocation amount corresponding to the queue Px from the allocation amount cumulative value corresponding to the queue Px. At S805, the IOPS ratio control part 312 decrements the accumulation command CV corresponding to the queue Px by one.

After getting out of a loop from S803 to S805, or after S806, the IOPS ratio control part 312 increments Px by one (S807). Thereafter, if Px exceeds a predetermined value (S808: YES), this flow is ended because all the queues are checked. On the other hand, if Px does not exceed the predetermined value (S807: NO), the process following S801 is performed for the queue corresponding to Px after increment.

The above is the explanation for the flow of the activation object command number calculation process (IOPS ratio control). After this process, the activation order decision process (response time ratio control) is performed.

Next, the activation order decision process will be described below.

Figure 9:
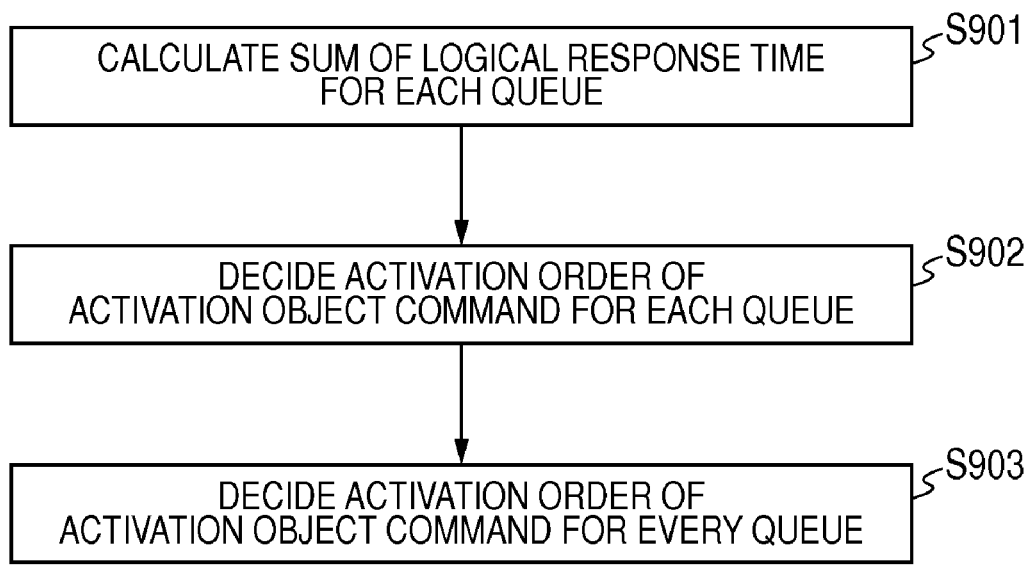
FIG. 9 shows the outline of an activation order decision process.

FIG. 9 shows the flow of the outline of the activation order decision process.

The activation order decision process is largely divided into three steps, as shown in FIG. 9.

S901: Calculate the sum of logical response time for each queue.

S902: Decide the activation order for each queue based on the sum of logical response time.

S903: Decide the activation order of activation object command for all the queues.

The time length from issuing the command to returning the response to activation of the command, namely, the response time, is susceptible to the wait time (wait time until the command is activated) in each queue. For example, the command having long wait time has a long response time, and the command having short wait time has a short response time. In view of this point, the control of the wait time in the queue leads to the control of response time.

Herein, the logical response time is defined, and the activation order is controlled by adjusting this value. The "logical response time" represents the wait time until a certain command is activated. More specifically, for the Nth command in the queue, there are N activation wait commands, including the Nth command itself, whereby the logical response time is $1+2+\ldots+N=N\times(N+1)/2$, for example. Since this value is reflected to the response time, the ratio of response time can be inversely proportional to the allocation ratio if the ratio of logical response time is made inverse ratio (ratio of inverse) of the allocation ratio.

Figure 10:
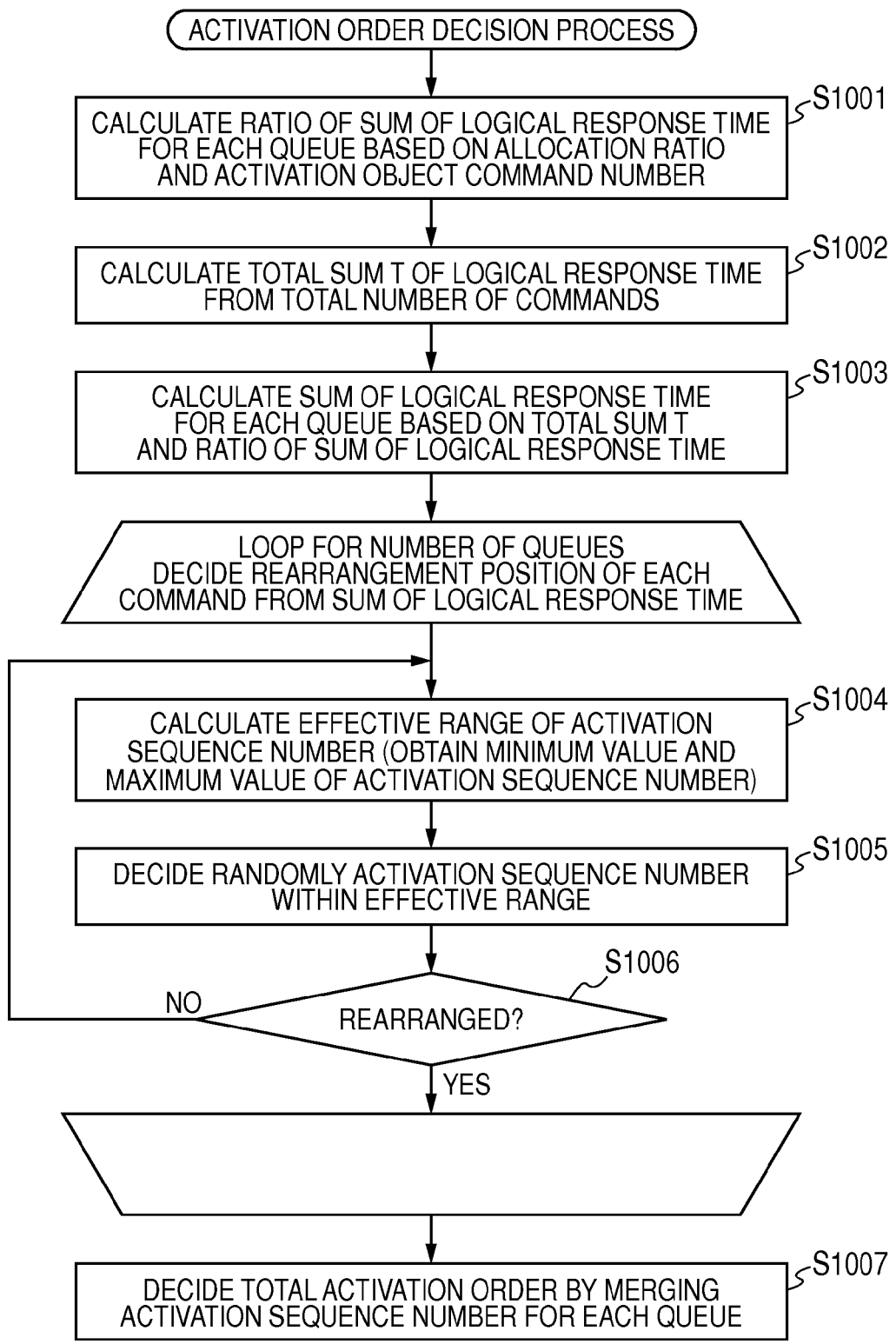
FIG. 10 shows the flow of the details of the activation order decision process.

FIG. 10 shows the flow of the details of the activation order decision process. Referring to FIG. 10, the process from S901 to S903 will be described below in detail.

<S901 of FIG. 9>

The response time ratio control part 313 calculates the sum of logical response time for each queue, based on the allocation ratio for each queue and the activation object command number decided in the activation object command number calculation process. More specifically, the following process (901-1) to (901-3) is performed. In the following process, the ratio of the allocation ratio for each queue is $S0:S1:\ldots:Sk$ (k is the number of queues), and the activation object command number corresponding to the queue is n.

(901-1) The response time ratio control part 313 calculates the ratio of the sum of logical response time (value of the term composing the ratio of the sum of logical response time) for each queue (S1001 of FIG. 10). Providing that the ratio of the sum of logical response time corresponding to the queue (i) is $WT_i$, $WT_i$ is calculated by the following (expression 1).

Where S is the total value of all the allocation ratios corresponding to all the queues (S is represented by the following (expression 2)).

Where $n_i$ is the activation object command number corresponding to the queue (i). The sum of logical response time is the value calculated for each queue, or the total of logical response time for each activation object command in the queue.

(901-2) The response time ratio control part 313 calculates the total sum T that is the total of the sum of logical response time for each queue (S1002 of FIG. 10). More specifically, the total sum T is calculated by the following (expression 3).

Where N=n. Also, t is a constant value as the processing time required for one command. The reason why the total sum T is calculated by this expression is that the xth activation object command needs to wait for the previous (x-1) activation object commands to be activated.

(901-3) The response time ratio control part 313 calculates the sum of logical response time for each queue, using the ratio of the sum of logical response time for each queue calculated in the above (9-1) and the total sum T calculated in the above (9-2) (S1003 of FIG. 10). Assuming that the sum of logical response time for the queue (i) is $W_i$, $W_i$ is calculated by the following (expression 4).

If the calculated value is not the integer, the previous or succeeding integer is made Wi.

<S902 of FIG. 9>

If the sum of logical response time for each queue is calculated, the activation object command number for the queue is known, whereby it is found how long logical response time of the activation object command for each queue is needed to satisfy the calculated sum (i.e., what the activation sequence number is).

For example, under the following conditions (A) to (C)

Figure 11A:
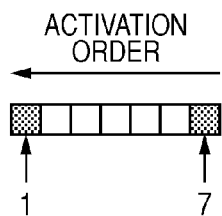
FIG. 11A shows an example of the first set of elements making up the sum of logical response time.
Figure 11B:
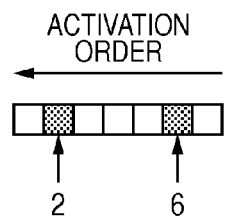
FIG. 11B shows an example of the second set of elements making up the sum of logical response time.
Figure 11C:
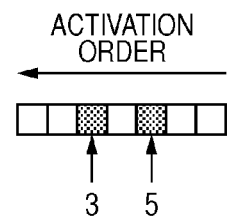
FIG. 11C shows an example of the third set of elements making up the sum of logical response time.

(A) the activation object command number M (M represented by the following (expression 5), namely, the total number of the activation object command number for each queue) for all the queues is 7, (B) the activation object command number n corresponding to a certain queue is 2, and (C) the sum $W_i$ of logical response time is 8, the activation sequence number for each of two activation object commands N0 and N1 corresponding to a certain queue is in the relationship where the sum of activation sequence number satisfies 8. More specifically, the activation sequence number for two activation object commands (N0, N1), represented in terms of (TU1, TU2), is the set (1, 7) as shown in FIG. 11A, the set (2, 6) as shown in FIG. 11B or the set (3, 5) as shown in FIG. 11C.

Thus, the response time ratio control part 313 performs the following process for each queue.

(902-1) The response time ratio control part 313 calculates the effective range of activation sequence number (S1004 of FIG. 10).

(902-2) The response time ratio control part 313 decides the activation sequence number of the activation object command within the effective range of activation sequence number (S1005 and S1006 of FIG. 10: NO).

The above (902-1) and (902-2) will be described below in detail, taking the queue (i) as an example.

The sum $W_i$ of logical response time is divided into the sum of n integers $K_0, K_1, \ldots, K_{n-1}$ (i.e., $W_i = K_0 + K_1 + \ldots + K_{n-1}$). However, n integers do not include the same integer above 1, but include mutually different integers only. Also, each integer included in n integers has the value less than or equal to M (greater than 0) represented by the (expression 5) as previously described (i.e., $(M>)K_0 > K_1 > \ldots > K_{n-1}(>0)$)

Herein, the permissible range for $K_i$ (integer included in the n integers), namely, the effective range, is represented by the following (expression 6).
[Expression 6]

$K_i$ is randomly decided from the effective range.

Figure 12A:
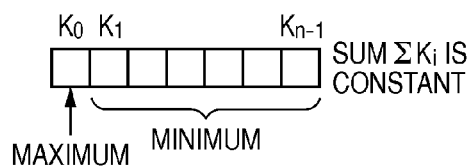
FIG. 12A is a view referred to in the explanation for a method for calculating the maximum value in the effective range.
Figure 12B:
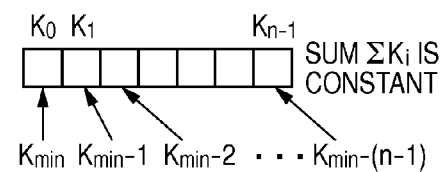
FIG. 12B is a view referred to in the explanation for a method for calculating the minimum value in the effective range.

$K_{max}$ is calculated by the following method (see FIG. 12A) That is, $K_0$ is maximum when $K_1 + \ldots + K_{n-1}$ is minimum, that is, when $K_1 + \ldots + K_{n-1} = 1 + 2 + \ldots + (n-1)$ $(n-1)*n/2$ is minimum. Since "A" represented by the following (expression 7) is the fixed value $W_i$, $K_{max}$ is calculated by the following (expression 8), assuming that the maximum value of $K_0$ is $K_{max}$, On the other hand, $K_{min}$ is calculated by the following method (see FIG. 12B). That is, $K_0$ is minimum when $K_1 = K_0 - 1, K_2 = K_0 - 2, \ldots, K_{n-1} = K_0 - (n-1)$. Since "A" represented by the above (expression 7) is the fixed value $W_i$, $W_i = K_{min} + K_{min} - 1 + \ldots + K_{min} - (n-1)$, assuming that the minimum value of $K_0$ is $K_{min}$, whereby $K_{max}$ is calculated by the following (expression 9), For the above reason, the permissible range for $K_0$ (i.e., effective range) is represented by the following (expression 10).

From this range, the activation sequence number of each activation object command is decided for each queue.
<S903 of FIG. 9>

The response time ratio control part 313 decides the overall activation order, based on the activation order decided for each queue (S1007 of FIG. 10). In the following, the activation order for the queue is called a "local activation order", the activation sequence number in the local activation order is called a "local activation sequence number", and the overall activation order for all the queues is called a "global activation order", and the activation sequence number in the global activation order is called a "global activation sequence number". The local activation sequence number is the value K randomly selected from the effective range.

Figure 13:
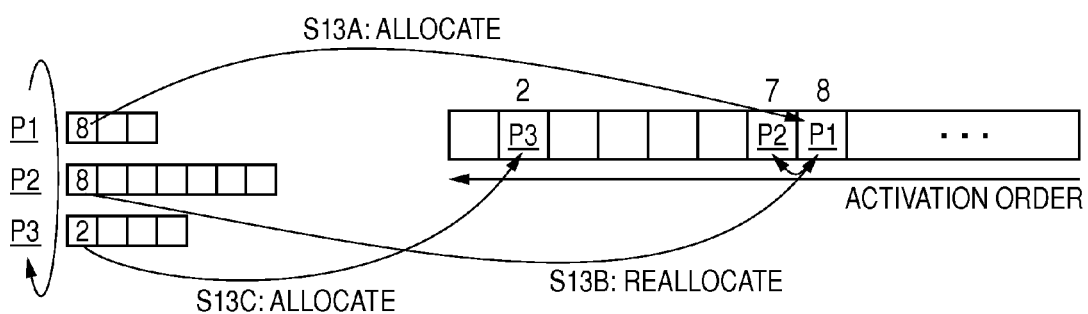
FIG. 13 shows the outline of a method for deciding the global activation sequence number.

More specifically, the response time ratio control part 313 checks the queues by round robin from the queue P1 with the highest priority, for example, as shown in FIG. 13. That is, the response time ratio control part 313 decides the global activation sequence number for one activation object command in the checked queue, then checks the queue with the next highest priority, and decides the global activation sequence number for one activation object command in the checked queue.

The global activation sequence number is the same sequence number as the local activation sequence number as a rule.

For example, if the local activation sequence number of the certain activation object command in the queue P1 is "8", the same sequence number "8" as the local activation sequence number is allocated as the global activation sequence number of the activation object command (S13A), as shown in FIG. 13. Since the activation sequence number of one activation object command for the queue P1 is decided, the queue P2 is then checked.

If the local activation sequence number of the certain activation object command in the queue P2 is "8", the sequence number "7" immediately before "8" is allocated as the global activation sequence number of that activation object command, because "8" is already allocated as the global activation sequence number (S13B). If the sequence number "7" is already decided, the sequence number "9" immediately after "8" is allocated. That is, if the same sequence number as the local activation sequence number is already decided as the global activation sequence number, the undecided sequence number closest to the local activation sequence number is allocated as the global activation sequence number. Since the activation sequence number of one activation object command is decided for the queue P2, the queue P3 is checked.

In the case where the local activation sequence number of the certain activation object command in the queue P3 is "2", the same sequence number "2" as the local activation sequence number is allocated as the global activation sequence number of the activation object command (S13C). Since the activation sequence number of one activation object command in the queue P3 is decided, the queue P1 is then checked.

Figure 14:
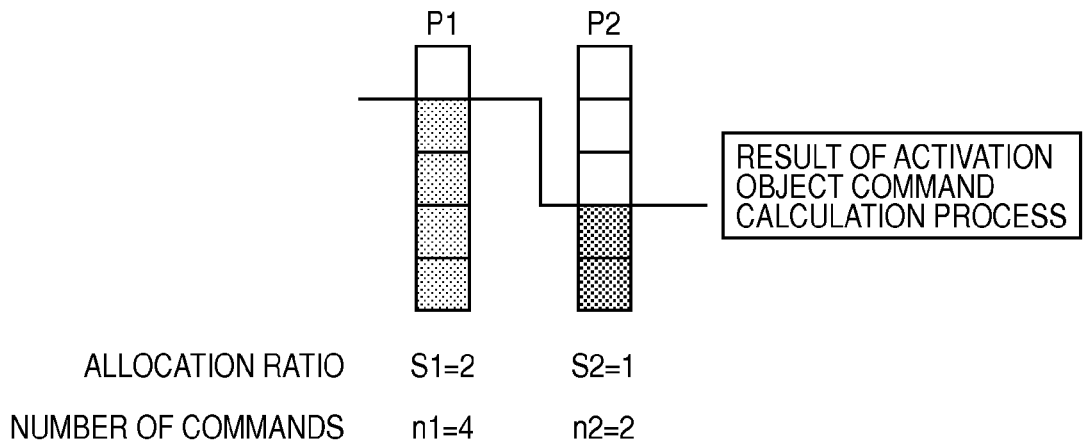
FIG. 14 is a view referred to in the explanation for one example of the activation order decision process.

The above is the explanation for the activation order decision process. Referring to FIG. 14, one example of this activation order decision process will be described below, using two queues P1 and P2.

It is supposed that the allocation ratio S1, S2 corresponding to the queue P1, P2 is S1=2, S2=1 (S1:S2=2:1). Also, it is supposed that the activation object command number n1, n2 corresponding to the queue P1, P2 is n1=4, n2=2. For the IOPS ratio control, the activation object command number becomes equal to the allocation ratio.

The ratio of the sum of logical response time is $$W0:W1=(S0+S1)/S0*N0:(S0+S1)/S1*N1=1:1$$

On the other hand, the total number N of the activation object command numbers is $$N=n0+n1=6$$

Also, the total sum T of logical response time is $$T=N*(N+1)/2=21$$

Hence, the sum of logical response time for the queue P1, P2 is $$W0'=W0/(W0+W1)*N0=10.5$$

$$W1'=W1/(W0+W1)*N1=10.5$$

Supposing (W0',W1')=(11,10) or (10,11), if W0' and W1' are divided $$W0'=1+2+3+5$$

$$W1'=4+6$$

That is, four activation object commands for the queue P1 are activated at the first, second, third and fifth order, and two activation object commands for the queue P2 are activated at the fourth and sixth order.

The average value of the logical response time is $$W0\_average=(1+2+3+5)/4=11/4=2.75$$

$$W1\_average=(4+6)/2=5$$

That is, the ratio of logical response time between the queues P1 and P2, namely, the ratio of response time, is 2.75:5, or almost equal to the inverse ratio (1/2:1) of the allocation ratio.

<Method Selection>

Though a selection between the activation number control method and the activation order control method may be manually made for each port from the outside (e.g., the host or management computer), the selection may be automatically made by the method selection PG 301 in this embodiment.

Figure 15:
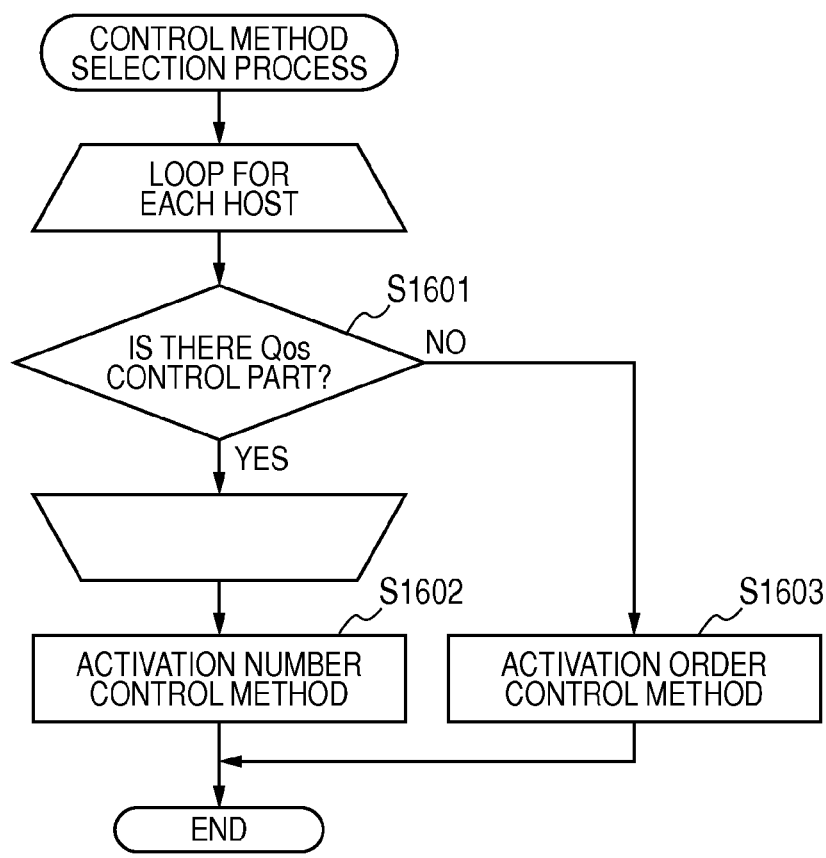
FIG. 15 shows the flow of a control method selection process.

FIG. 15 shows the flow of the control method selection process.

The method selection PG 301 performs this flow for each port. In the following explanation with reference to FIG. 15, the port of processing object is called an "object port".

The method selection PG 301 judges whether or not the Qos control part is provided for the selected host (hereinafter referred to as an "object host" in the explanation of FIG. 15) among one or more hosts connected to the object port (S1601). The method selection PG 301 judges whether or not the Qos control part is provided for the object host by referring to the host component information (e.g., information managed in the memory 125 of the storage system 110) from the object host and analyzing the information, for example.

The method selection PG 301, if judging that the Qos control part is not provided for the object host (S1601: NO), selects the activation order control method for the object port without making the judgment at S1601 for the other hosts (S1603) That is, the activation order control PG 305, not the activation number control PG 303, is performed for the object port.

On the other hand, the method selection PG 301, if judging that the Qos control part is provided for the object host (S1601: YES), selects another host and makes the judgment at S1601. If the result of the judgment at S1601 is affirmative for every host connected to the object port, the method selection PG 301 selects the activation number control method for the object port (S1602). That is, the activation number control PG 303, not the activation order control PG 305, is performed for the object port.

The two control methods as previously described have different features. That is, the activation number control method has the relatively simple process, but is not aware of the number of commands accumulated in the queue, whereby if the number of commands (load on the queue) accumulated in each queue is greatly different, the ratio of response time can not be controlled, though the IOPS ratio can be controlled. On the other hand, the activation order control method has a higher processing load than the activation number control method, but can control not only the IOPS ratio but also the ratio of response time within the storage system 110, whereby the suitable command activation control is enabled in the situation where the load on the queue is different. Accordingly, if the Qos control part is provided outside the storage system 110 (the I/O issuing frequency can be adjusted from the outside), the activation number control method is considered to be preferable. On the other hand, in the configuration where the Qos control part is not provided outside the storage system 110, the activation order control method is considered to be preferable. According to the above flow, if at least one host connected to the object port does not have the Qos control part, the activation order control method is selected. Thereby, the storage system 110 can provide the Qos appropriately.

Though the preferred embodiment of the invention has been described above, the invention is not limited to this embodiment, but it is needless to say that various changes may be made without departing from the spirit or scope of the invention.

What is claimed is:

1. A storage system which includes a plurality of physical storage units, for receiving an I/O command from a host computer and making the I/O from/to at least one of said plurality of physical storage units in response to the received I/O command, comprising:

a queue corresponding to each priority of the command;

a port for accepting the command from the host computer;

a command accumulation part for specifying the priority of the received command and accumulating said received command in the queue corresponding to the specified priority;

an activation order control part for deciding the activation order of the command; and a command activation part for activating the command of activation object in accordance with the decided activation order;

wherein said activation order control part is configured to:

(1-1) decide, for each queue, the number of activation object commands that are the commands to be activated among a plurality of commands accumulated in the queue, based on the priority corresponding to the queue; and (1-2) decide the activation order of activation object commands, based on the number of activation object commands decided for each queue, so that the average value of logical response time for the activation object command may be shorter at the higher priority, wherein an allocation ratio that is a value based on the number of commands activated per unit time is preset for each queue, in which said activation order control part is configured to perform the following (1-2-1) to (1-2-5) at said (1-2), (1-2-1) calculating the ratio of the sum of logical response time by computing (allocation ratio/total of allocation ratio)×number of activation object commands for each queue, (1-2-2) calculating the total T of the sum of logical response time by calculating the sum from 1 to the total number N of activation object commands, (1-2-3) calculating the sum of logical response time by computing (ratio of the sum of logical response time/total of ratio of the sum of logical response time)×T for each queue, and if the calculated value is not an integer, making the sum of logical response time an integer immediately before or after the value, (1-2-4) specifying n (number of activation object commands for the queue) integers that can become the elements of said sum of logical response time for each queue, and (1-2-5) making the activation sequence number of the activation object command the sequence number represented by the specified integer for each activation object command, and if the sequence number is the same as the activation sequence number as already decided for the other activation object command, the sequence number the most recent undecided sequence number closest to the sequence number.

2. The storage system according to claim 1, wherein at said (1-2-4), the specified integer is the integer belonging to the effective range, and said n integers do not include the same integer, in which the maximum number of said effective range is the sum of logical response time $-(n-1) \times n/2$, and the minimum value of said effective range is $2 \times \{2 \times \text{sum of logical response time} + n \times (n-1)/n$.

3. The storage system according to claim 2, wherein at said (1-2-5), a plurality of queues are checked by round robin, and every time the queue is checked, the activation sequence number is decided for one activation object command in the checked queue.

4. The storage system according to claim 3, wherein the upper limit value of execution command is preset for each queue, and at said (1-1), the number of activation object commands decided for each queue is less than or equal to a difference between the upper limit value of execution command corresponding to the queue and the number of already active commands for the queue.

5. The storage system according to claim 4, further comprising an activation number control part, in which the number of activations depending on the priority is preset for each queue, said activation number control part activates the same number of commands per unit time as the preset number of activations for each queue, and the control part selected from said activation order control part and said activation number control part is executed.

6. The storage system according to claim 5, further comprising a selection part for selecting the control part of execution object from said activation order control part and said activation number control part, in which said selection part selects said activation number control part if said host computer has an adjustment part for adjusting the command issuing frequency, or selects said activation order control part if said host computer does not have said adjustment part.

7. The storage system according to claim 6, wherein said activation order control part or said activation number control part performs the processing for each port.

8. A storage system which includes a plurality of physical storage units, for receiving an I/O command from a host computer and making the I/O from/to at least one of said plurality of physical storage units in response to the received I/O command, comprising:
   a queue corresponding to each priority of the command;
   a port for accepting the command from the host computer;
   a command accumulation part for specifying the priority of the received command and accumulating said received command in the queue corresponding to the specified priority;
   an activation order control part for deciding the activation order of the command; and
   a command activation part for activating the command of activation object in accordance with the decided activation order;
   wherein said activation order control part is configured to:
   (1-1) decide, for each queue, the number of activation object commands that are the commands to be activated among a plurality of commands accumulated in the queue, based on the priority corresponding to the queue; and
   (1-2) decide the activation order of activation object commands, based on the number of activation object commands decided for each queue, so that the average value of logical response time for the activation object command may be shorter at the higher priority,
   wherein at said (1-2), the activation order of activation object commands is decided for each queue so that the ratio of the average value of logical response time may be the inverse ratio of the allocation ratio, the allocation ratio being a parameter value based on the priority, in which the sum of logical response time for each queue is based on the time taken until all the activation object commands decided for each queue are activated.

9. The storage system according to claim 8, wherein at said (1-2), said activation order control part specifies n (n is the number of activation object commands for the queue) integers that can become the elements of said sum of logical response time for each queue, and the activation sequence number of activation object command is the sequence number represented by the specified integer for each activation object command.

10. The storage system according to claim 9, wherein a plurality of queues are checked by round robin, and every time the queue is checked, the activation sequence number is decided for one activation object command among the checked queues.

11. The storage system according to any one of claims 1 and 8 to 10, wherein the upper limit value of execution command is preset for each queue, and at said (1-1), the number of activation object commands decided for each queue is less than or equal to a difference between the upper limit value of execution command corresponding to the queue and the number of already active commands for the queue.

12. The storage system according to claim 11, further comprising an activation number control part, in which the number of activations depending on the priority is preset for each queue, said activation number control part activates the same number of commands per unit time as the preset number of activations for each queue, and the control part selected from said activation order control part and said activation number control part is executed.

13. The storage system according to any one of claims 1 and 8 to 10, further comprising an activation number control part, in which the number of activations depending on the priority is preset for each queue, said activation number control part activates the same number of commands per unit time as the preset number of activations for each queue, and the control part selected from said activation order control part and said activation number control part is executed.

14. The storage system according to claim 13, further comprising a selection part for selecting the control part of execution object from said activation order control part and said activation number control part, in which said selection part selects said activation number control part if said host computer has an adjustment part for adjusting the command issuing frequency, or selects said activation order control part if said host computer does not have said adjustment part.

15. A command activation control method for use with a storage system for receiving an I/O command from a host computer, and making the I/O from/to at least one of a plurality of physical storage units in response to the received I/O command, including:
   specifying a priority of the received command if a command is received from the host computer and accumulating said received command in a queue corresponding to the specified priority among queues corresponding to every priority;
   deciding, for each queue, the number of activation object commands that are the commands to be activated among a plurality of commands accumulated in the queue, based on the priority corresponding to the queue;

deciding the activation order of activation object commands, based on the number of activation object commands decided for each queue, so that the average value of logical response time for the activation object command may be shorter at the higher priority; and activating the activation object commands in accordance with the decided activation order, wherein an allocation ratio that is a value based on the number of commands activated per unit time is preset for each queue, the method further comprising performing the following (1-2-1) to (1-2-5) at said (1-2):

(1-2-1) calculating the ratio of the sum of logical response time by computing (allocation ratio/total of allocation ratio)×number of activation object commands for each queue, (1-2-2) calculating the total T of the sum of logical response time by calculating the sum from 1 to the total number N of activation object commands, (1-2-3) calculating the sum of logical response time by computing (ratio of the sum of logical response time/total of ratio of the sum of logical response time)×T for each queue, and if the calculated value is not an integer, making the sum of logical response time an integer immediately before or after the value, (1-2-4) specifying n (number of activation object commands for the queue) integers that can become the elements of said sum of logical response time for each queue, and (1-2-5) making the activation sequence number of the activation object command the sequence number represented by the specified integer for each activation object command, and if the sequence number is the same as the activation sequence number as already decided for the other activation object command, the sequence number the most recent undecided sequence number closest to the sequence number.

16. The method according to claim 15, wherein at said (1-2-4), the specified integer is the integer belonging to the effective range, and said n integers do not include the same integer, in which the maximum number of said effective range is the sum of logical response time−(n−1)×n/2, and the minimum value of said effective range is 2×{2×sum of logical response time+n×(n−1)/n .

17. The method according to claim 16, wherein at said (1-2-5), a plurality of queues are checked by round robin, and every time the queue is checked, the activation sequence number is decided for one activation object command in the checked queue.

18. The method according to claim 17, wherein the upper limit value of execution command is preset for each queue, and at said (1-1), the number of activation object commands decided for each queue is less than or equal to a difference between the upper limit value of execution command corresponding to the queue and the number of already active commands for the queue.

* * * * *